United States Patent
Kemmer

(10) Patent No.: US 10,084,575 B2
(45) Date of Patent: Sep. 25, 2018

(54) INTEGRATION OF NON-HOMOGENOUS COMMUNICATION SYSTEMS

(71) Applicant: SAP SE, Walldorf (DE)

(72) Inventor: Johann Kemmer, Muhlhausen (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 15/178,496

(22) Filed: Jun. 9, 2016

(65) Prior Publication Data

US 2017/0359157 A1    Dec. 14, 2017

(51) Int. Cl.
*H04L 5/00*     (2006.01)
*H04L 12/801*   (2013.01)

(52) U.S. Cl.
CPC ............ *H04L 5/0032* (2013.01); *H04L 47/10* (2013.01)

(58) Field of Classification Search
CPC ..... H04L 12/801; H04L 47/10; H04L 5/0032; H04L 5/00
See application file for complete search history.

(56) References Cited

U.S. PATENT DOCUMENTS

| | | | |
|---|---|---|---|
| 7,120,703 B2 | 10/2006 | Li et al. | |
| 7,346,893 B2 | 3/2008 | Deimel et al. | |
| 7,580,946 B2 | 8/2009 | Mansour et al. | |
| 7,634,726 B2 | 12/2009 | Ims et al. | |
| 7,657,436 B2 | 2/2010 | Elmore et al. | |
| 9,063,743 B2 | 6/2015 | Spiess et al. | |
| 2011/0307263 A1* | 12/2011 | Bader | G06Q 10/06 705/1.1 |
| 2014/0006306 A1* | 1/2014 | Koshy | G06Q 10/10 705/345 |
| 2014/0282081 A1* | 9/2014 | Stollarski | H04L 51/34 715/752 |
| 2017/0255649 A1* | 9/2017 | Motoyama | G06F 17/30253 |

\* cited by examiner

*Primary Examiner* — Charles C Jiang
*Assistant Examiner* — Kyaw Z Soe
(74) *Attorney, Agent, or Firm* — Mintz Levin Cohn Ferris Glovsky and Popeo, P.C.

(57) ABSTRACT

Selecting an output channel, from a plurality of output channels of a communication system associated with a database management system, for transmission of an entity document to an entity from the database management system. The determining based on an entity classification of the entity within the database management system. Responsive to receiving a service-orientated-architecture service request for the entity at the database management system, the service-orientated-architecture (SOA) service request is converted to a message having a format associated with the entity classification of the entity. Converting the SOA includes selecting, based on a content of the SOA service request, a template, having a predefined set of semantics, associated with the entity classification of the entity, selecting a semantic that corresponds to the SOA service request, and transmitting the message with the selected semantic through the output channel.

20 Claims, 7 Drawing Sheets

INTEGRATION OF NON-HOMOGENOUS COMMUNICATION SYSTEMS

TECHNICAL FIELD

The subject matter described herein relates to facilitating standardized communications between non-standard communication systems used with database management systems.

BACKGROUND

Enterprise software is typically designed to be used in homogenous landscapes. This is especially true for the underlying communication technology. Consequently, standard communication protocols have been developed for electronic data exchange.

For example, service-orientated-architecture (SOA) services are the de facto standard for system internal communications, i.e., application-to-application communications, as well as for the electronic communication with external business partners, i.e., business-to-business communications, business-to-customer communications, and application-to-user(s) communications. These communication services are used when the communication infrastructures are homogenous in the sense of protocols and technology.

However, different entities, especially ones of different size, may each use a different communication infrastructure, especially when system landscapes used by the entities significantly differ from one another. These communication infrastructures may be homogenous within each entity and their customers or users, but may not be homogenous between two entities. For example, large entities may have a large scale enterprise resource planning (ERP) system, small entities may not have their own ERP system. Small entities typically manage business communications through personal communication devices that are commonly used by the general public. Personal communication devices do not typically support business-to-business or application-to-user(s) communication.

SUMMARY

In one aspect, methods, systems, and computer program products, for facilitating cross-communication between non-homogenous communication systems is described. The methods can perform, the systems can include components configured to perform, the computer program products can cause a computer to perform, one or more operations consistent with the presently described subject matter.

The operations can include selecting an output channel, from a plurality of output channels of a communication system, for transmission of an entity document to an entity. The selection of the output channel can be based on an entity classification of the entity. Responsive to receiving a service-orientated-architecture service request for the entity, the service-orientated-architecture service request can be converted to a message having a format associated with the entity classification of the entity. Converting the message can include selecting a template associated with the entity classification of the entity. The selection of the template can be based on a content of the service-oriented-architecture service request.

The template can be associated with a predefined set of semantics. One or more semantics can be selected from the predefined set of semantics that correspond to the service-oriented-architecture service request for inclusion into the message. The selected semantics can be included into the template and the message formed from the template.

The message can then be transmitted to the entity through the selected output channel.

The operations can be performed by a database management system through which the SOA service request is received. The SOA service request may be generated based on user input, automatically responsive to an occurrence of an event, or the like. The operations can be performed by the database management system associated with the communication system.

In some variations, the format associated with the entity classification of the entity can be short service message format, a multimedia message format, a facsimile template, or the like.

The operations can include receiving, from the entity, a response to the message. Based on the content of the service-oriented-architecture service request and using the predefined set of semantics, a content of the received response can be determined. In response to the content of the received response being affirmative, acceptance by the entity of the service-oriented-architecture service request can be indicated in a database. In response to the content of the received response being negative, a selection of an alternate entity for transmission of the service-oriented-architecture service request can be initiated.

In some variations, the operations can include receiving, through an input channel, a message from an entity. The input channel can provide an indication of a message format of the message. The message format of the message can be converted into a service-oriented-architecture service message format. The service-oriented-architecture service message format can have one or more fields corresponding to responses to a service-oriented-architecture service request. A determination can be made as to whether the message from the entity includes information that corresponds to the one or more fields of the service-oriented-architecture service request. A database can be populated in response to determining that the message from the entity includes information that corresponds to the one or more fields of the service-oriented-architecture request.

In some variations, the converting and determining can be performed by a database management system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The presently described subject matter provides solutions for bridging the gap between different technological infrastructures allowing for the seamless operation of both technological infrastructures by their respective entities. These gaps occur when system landscapes significantly differ between entities. The different technology of the entities can prevent communication between the entities. When two entities have non-homogenous technology it can lead to the exclusion of entities that have incompatible information technology infrastructures. There can be additional process costs involved in communicating between entities. The additional process costs can be caused by the need to manually process various steps, and from the introduction of lack of transparency and automation. Those additional costs can lower or even vanish possible price advantages given by various business partners.

Some entities offer services that may not lend themselves to establishing sophisticated end-to-end communication infrastructures with such entities.

Where entities have non-homogenous communication systems, communication between the entities is typically performed manually rather than between the enterprise resource platform (ERP) systems. Consequently, the two entities respond to communications in an off-line mode relative to the other's communication system. Furthermore, sophisticated IT infrastructures are designed to be used by professionals trained in complex ERP systems. Entities that do not have personnel trained in the use of complex ERP systems, especially when these personnel have other competencies, cannot use the complex ERP systems and therefore cannot communicate with the entity that has one. This limitation, as well as entities having non-homogenous communication systems causing each entity to respond to communications in an off-line mode, excludes the use of application-to-user(s) communication systems.

In one aspect, an enterprise resource platform (ERP) configured to determine an output channel for a service-orientated-architecture (SOA) service request to a particular entity. One exemplary embodiment involves converting SOA service requests to a format associated with an entity receiving the SOA service request. Furthermore, the ERP can be configured to convert a response from a format associated with an entity to a SOA service request having a format standardized to the ERP.

The ERP can be configured to select a template for the converted SOA service request based on the content of the SOA service request and the determined output channel for the receiving entity. The template can include semantics to facilitate generation of an outgoing message in the format of the determined output channel, based on the content of the SOA service request.

Figure 1:
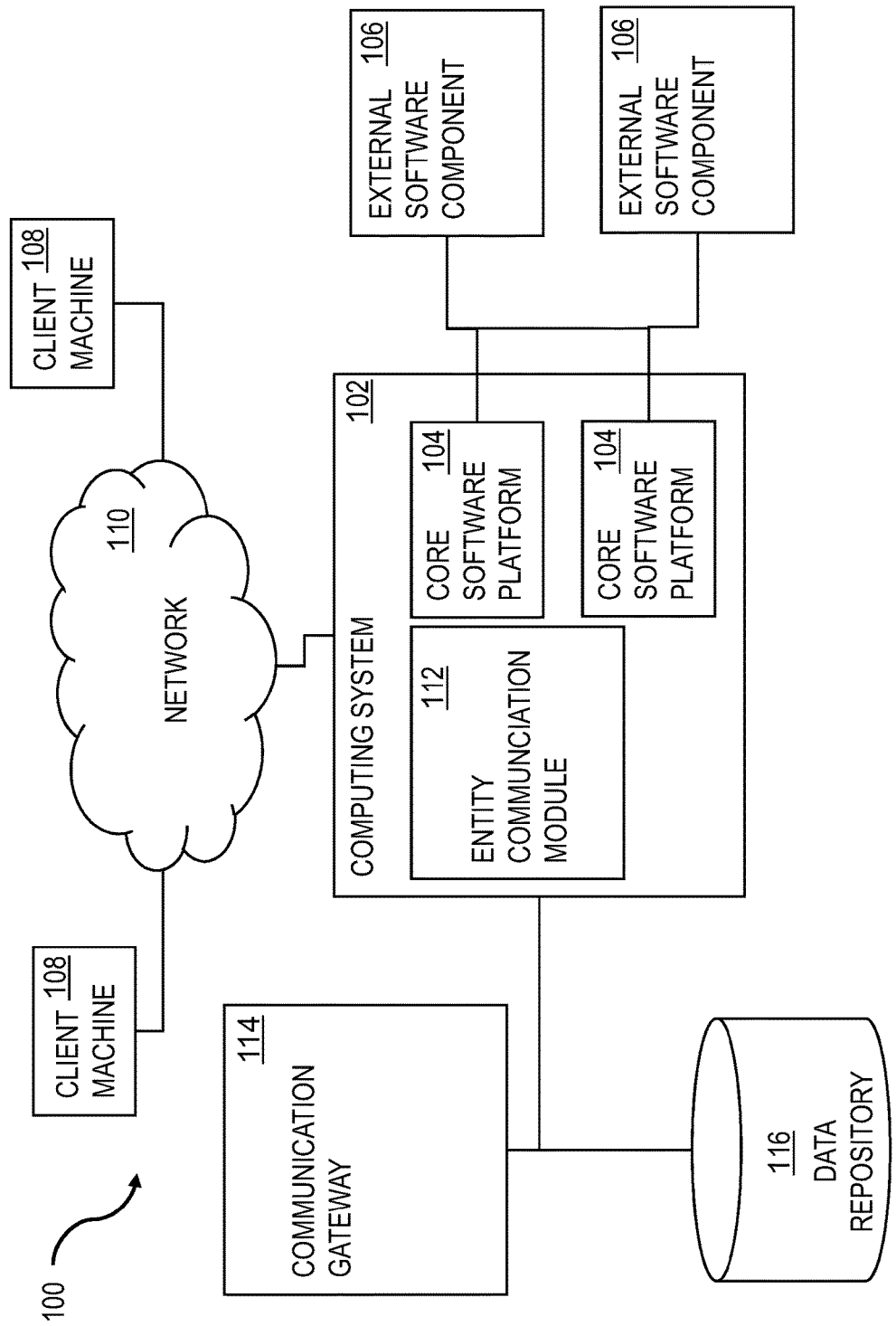
FIG. 1 is a diagram illustrating aspects of a system showing features consistent with implementations of the current subject matter.

FIG. 1 is a diagram illustrating aspects of a system 100 showing features consistent with implementations of the current subject matter. The core software platform of an ERP or other business software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. A computing system 102 can include one or more core software platform modules 104 providing one or more features of the ERP system. The computing system can also aggregate or otherwise provide a gateway via which users can access functionality provided by one or more external software components 106, which can optionally be provided by one or more service providers external to the one or more core software platform modules 104. Client machines 108 can access the computing system, either via a direct connection, a local terminal, or over a network 110 (e.g. a local area network, a wide area network, a wireless network, the Internet, or the like). An entity communication module 112 can be hosted on the computing system 102 or alternatively, on an external system accessible over a network connection. The entity communication module 112 can optionally include one or more discrete software and/or hardware modules that perform operations such as those described herein. The entity communication module 112 can be configured to provide the functionality described in relation to FIG. 2.

The system 100 can include a communication gateway 114. The communication gateway 114 can be in direct communication with the computing system 102. The communication gateway 114 can be in indirect communication with the computing system 102, for example, through a network 110. The communication gateway 114 can be configured direct and receive communications to an appropriate communication network based on the format of the communication, as described herein.

Figure 2:
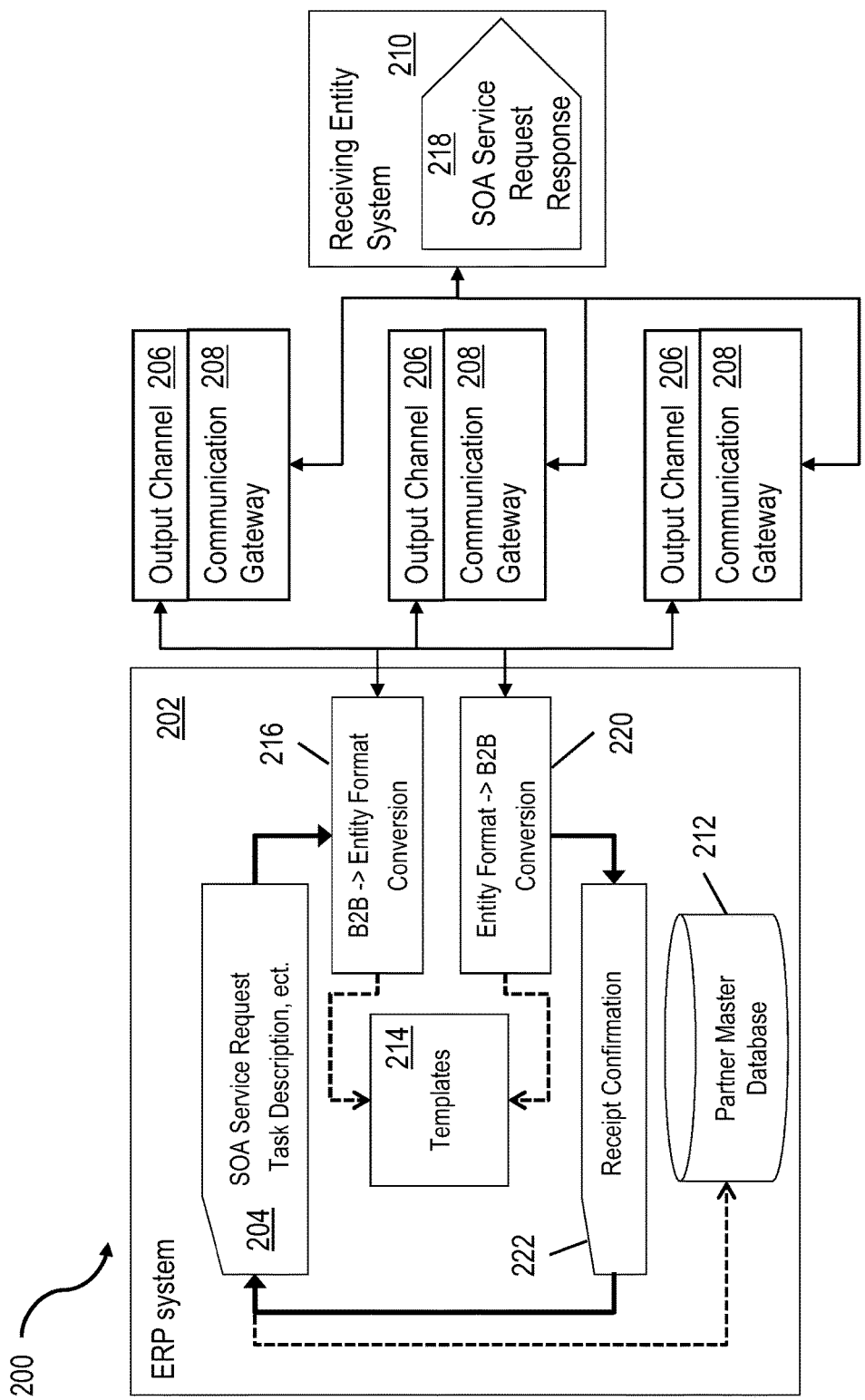
FIG. 2 is a process flow diagram illustrating aspects of a method having one or more features consistent with implementations of the current subject matter.

FIG. 2 is a process flow diagram 200 illustrating aspects of a method having one or more features consistent with implementations of the current subject matter. Referring to FIG. 1 and FIG. 2, an SOA service request 204 can be generated. The SOA service request 204 can be generated by the ERP system 202. The SOA service request 204 can be generated by one or more core software programs 104, an external software component 106, or the like. The SOA service request 204 can be associated with, for example, a request across a supply chain boundary that has inhomogeneous communication infrastructures on either side of the supply chain boundary.

The SOA service request 204 can be generated by a user of the ERP System 202, can be generated by the ERP system 202 in response to a triggering event, or the like. In some variations, the ERP system 202 can be configured to detect the occurrence of a triggering event and generate the SOA service request 204 for a receiving entity 210 associated with the triggering event. A triggering event can be the passage of a certain amount of time. For example, in response to the passage of a set period of time, or in response to the commencement of a season, the ERP system 202 can be configured to generate a SOA service request 204 for landscape maintenance on the premises of the entity associated with the ERP system 202.

A triggering event can be one or more actions initiated by, or through the ERP system 202. For example, the ERP system 202 can be used to purchase an item that requires an action by a contractor. For example, installation of a light fixture, specialized shipping instructions, or the like. In response to the ERP system 202 being used to purchase a light fixture or purchase an item requiring specialized shipping, the ERP system 202 can be configured to automatically generate an SOA service request 204 for a receiving entity 210 that can install the light fixture, or handle the specialized shipping.

The ERP system 202 can be configured to determine an output channel 206 for an SOA service request 204. Although FIG. 2 illustrates three different output channels 206, the ERP system can be configured to communicate through multiple output channels 206. Each output channel 206 can have an associated communication gateway 208. The associated communication gateway 208 can have a complementary format to the output channel 206.

Figure 3:
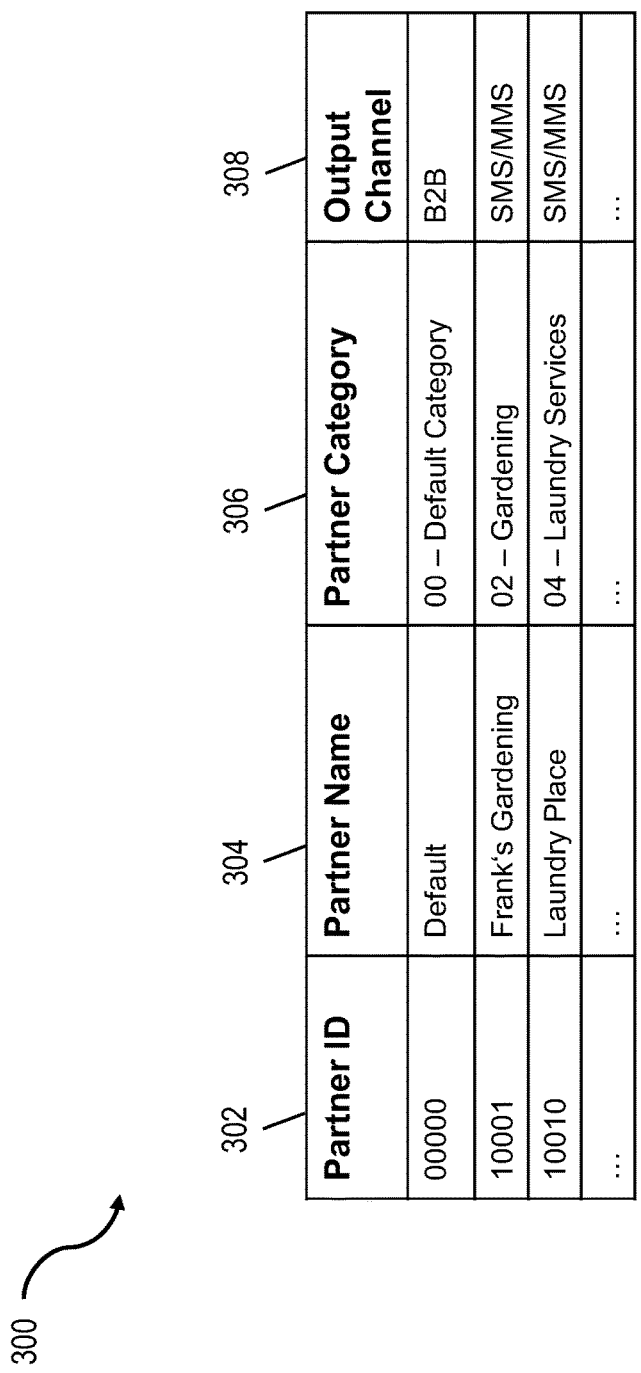
FIG. 3 is an illustration of an entity classification table having one or more features consistent with implementations of the presently described subject matter.

Determination of the output channel 206 can be based on the entity associated with the SOA service request 204. The SOA service request 204 can be generated for a specific entity 210. Entities can have a partner classification. The partner classification can be stored in electronic storage 212. FIG. 3 is an illustration of an entity classification table 300 having one or more features consistent with implementations of the presently described subject matter. The entity classification table 300 can facilitate determination of the output channel 206 for the SOA service request 204. The entity classification table 300 can include a partner identification 302. The partner identification 302 can act as a primary key. The entity classification table 300 can include a partner name 304. The entity classification table 300 can include a partner category 306 associated with the entity. The entity classification table 300 can include an output channel 308 associated with the entity.

The ERP system 202 can be configured to generate a SOA service request 204 for an entity 210. The ERP system 202 can be configured to reference the entity classification table 300 stored in the partner master database 212. The ERP system 202 can obtain the output channel 308 for the entity 210.

The ERP system 202 can be configured to select a template 214 based on the output channel 308 of the entity 210. The template 214 can be associated with the output channel of the entity 210. For example, if the output channel is a Short Message Service (SMS) output channel the template 214 can be a SMS template, if the output channel is a Multimedia Message Service (MMS) the template 214 can be a MMS template.

The template 214 can include a set of predefined semantics. The set of predefined semantics can be based on the format of the template 214. The predefined semantics can be configured to facilitate the evaluation of the SOA service request.

As a specific example, the SOA service request can be transformed from a format germane to the ERP system 202 into to a plain text message. This can be facilitated by a plain text template. The plain text template can include placeholders equipped with tags for the relevant business information obtained from the SOA service request. The relevant business information can include, for example, an order ID, a task description, a price, a fulfillment period, or the like. The plain text message can also contain a short instruction for the receiving entity, or service provider, on how to respond on the SOA service request contained in the plain text message in order to enable automatic processing of the confirmation/rejection by the ERP system 202. As an example, when the plain text message is an SMS message, the service provider can copy the task request ID (e.g., service order ID) and send it back together with a key word indicating the confirmation or rejection of the SOA service request.

Templates can be configured to facilitate the automatic conversion of SOA service request 204, and other enterprise documents, created in the demanding ERP system 202 into another format, for example, plain text messages. Templates can facilitate the automatic conversion of confirmations or rejections of SOA service requests received in a different format, for example, plain text messages, into a standard format for the ERP system 202, to facilitate storage in the demanding ERP system 202 and creation and/or update of SOA Service Requests in the same system, templates are introduced generically or specifically per underlying document, which inherit the information relevant for the external communication.

The ERP system 202 can include an outgoing converter 216. The outgoing converter 216 can be configured to convert the SOA service request into an outgoing message having a format associated with the determined output channel 206. The outgoing converter 216 can be configured to convert the SOA service request 204 based on the template 214.

The outgoing message having a format associated with the determined output channel 206 can be routed to the communication gateway 208 associated with the output channel 206. The communication gateway 208 can be configured to transmit the outgoing message to an entity system 210 of a partner. The entity system 210 can be configured facilitate generation of a response 218. The response 218 can be routed back to the ERP system 202 through the communication gateway 208 associated with the format of the response 218. The format of the response 218 can be the same as the format of the outgoing message sent from the ERP system 202. The ERP system 202 can include an incoming converter 220. The incoming converter 220 can be configured to convert the response 218 into an SOA service request response that is readable by the ERP system 202.

When receiving the confirmation/rejection message from the receiving entity 210 in a format associated with the receiving entity 202, for example, in plain text format, a parser can be configured to extract the relevant information, such as order ID, confirmation or rejection, or the like. The parser can obtain the information via its data format, e.g. order number, or via key words, e.g., confirmed or rejected, or using a method for the evaluation of unstructured data from the plain text and creates e.g. a message that is standardized to the ERP system 202. This can facilitate automatic creation and/or update of documents in the ERP system.

The ERP system 202 can be configured to generate a receipt confirmation 222. The receipt confirmation 222 can be used by the ERP system 202 as an indicator that the receiving entity 210 has received and responded to the converted SOA service request 204. The ERP system 204 can be configured to update the ERP system 204 to include an indication that the receiving entity 210 has provided confirmation of an action associated with the SOA service request 204, an inaction associated with the SOA service request 204, or the like.

The user of the ERP system 202 that initiated the SOA service request 204 can be notified of the response from the receiving entity 210.

In some variations, when a communication is received from an entity, the entity can be verified using the partner master database 212. One or more identifying data can be cross-referenced with the classification table 300 to ensure that the entity is using the proper format for communicating with the ERP system 202.

Figure 4:
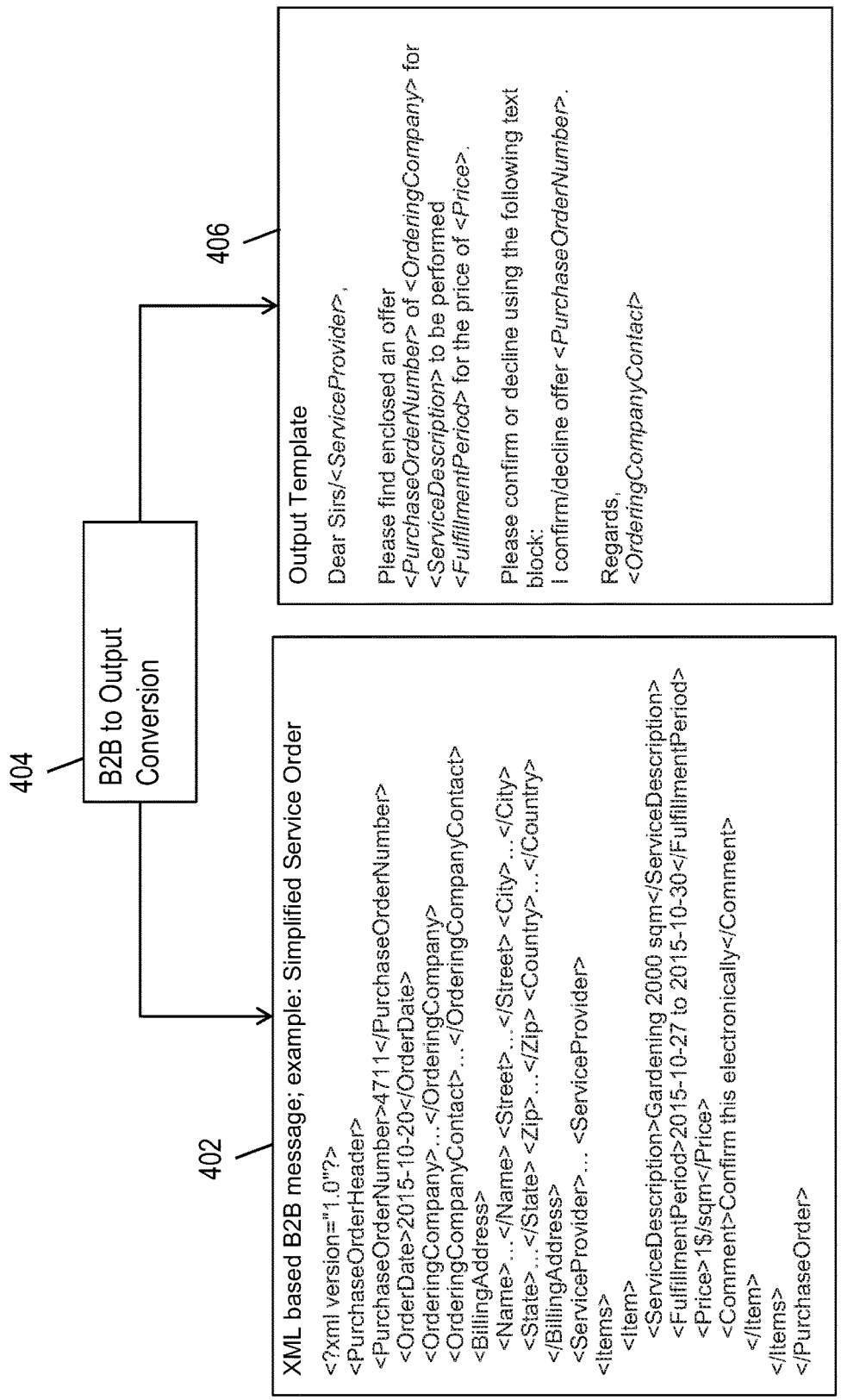
FIG. 4 illustrates exemplary format conversion in a system having one or more functions consistent with the presently described subject matter.

FIG. 4 illustrates an exemplary format conversion in a system having one or more functions consistent with the presently described subject matter. An SOA service request may have a format 402. The format 402 can be associated with an ERP system. A converter 404 can be configured to convert the SOA service request from the format 402 associated with the ERP system to a format 406 associated with the communication systems of the recipient entity.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
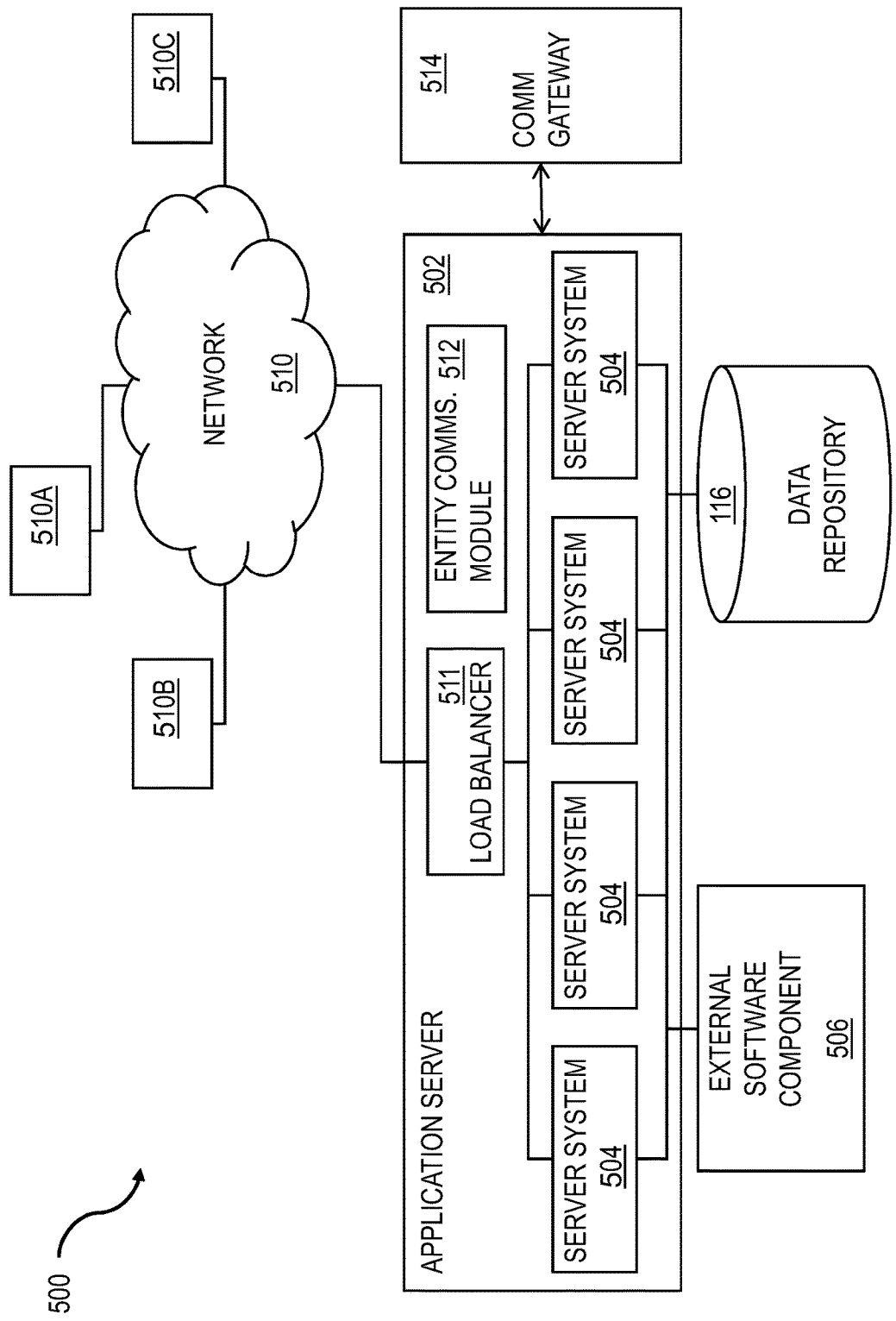
FIG. 5 is a diagram illustrating aspects of a system showing features consistent with implementations of the current subject matter.

FIG. 5 shows a block diagram of a multi-tenant implementation of a software delivery architecture 500 that includes an application server 502, which can in some implementations include multiple server systems 504 that are accessible over a network 510 from client machines operated by users at each of multiple organizations 510A-510C (referred to herein as "tenants" of a multi-tenant system) supported by a single software delivery architecture 500. For a system in which the application server 502 includes multiple server systems 504, the application server can include a load balancer 511 to distribute requests and actions from users at the one or more organizations 510A-510C to the one or more server systems 504. Instances of the core software platform 104 (shown in FIG. 1) can be executed in a distributed manner across the server systems 504. A user can access the software delivery architecture across the network using a thin client, such as for example a web browser or the like, or other portal software running on a client machine. The application server 502 can access data and data objects stored in one or more data repositories 116. The application server 502 can also serve as a middleware component via which access is provided to one or more external software components 106 (shown in FIG. 1) that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 511. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 511), scalability via addition or removal of a server system 504 that is accessed via the load balancer 511, and de-coupled lifecycle processes (such as for example system maintenance, software upgrades, etc.) that enable updating of the core software independently of tenant-specific customizations implemented by individual tenants.

As in the example illustrated in FIG. 1, the data repository 116 can store a business object that represents a template definition of a standard business process. Each individual tenant 510A-510C can customize that standard template according to the individual business process features specific to business of the organization to which that tenant is assigned. Customizations can be stored as extensions in the metadata repository.

To provide for customization of the business process for each of multiple organizations supported by a single software delivery architecture 500, the data and data objects stored in the metadata repository 116 and/or other data repositories that are accessed by the application server 502 can multiple types of content.

The entity communication module 512 can be configured to provide similar functionality to the entity communication module 112 illustrated in FIG. 1 and the functionality described in relation to FIG. 2. However, the entity communication module 512 can be configured to provide bespoke entity communication functions for the different tenants 510A-510C or the entity communication module 512 can be configured to manage the entity communication functions for the different tenants 510A-510C collectively.

Each tenant 510A-510C may have a bespoke communication protocol for communicating with entities that have non-homogenous communication systems. Non-homogenous communication systems means communication systems that are not homogenous with the tenant's communication systems. The entities may have homogenous communication systems for internal communications, but they may not be compatible with a tenants communication system.

Each tenant 510A-510C may have their own templates stored in the data repository 116. The application server 502 can be configured to cause querying the data repository 116 in response to the generation of an SOA service request by one of the tenants 510A-510C. The SOA service request from one of the tenants 510A-510C can be converted by the application server 502 into a communication format associated with the receiving entity for the SOA service request. The application server 502 can transmit the converted message to the communication gateway 514 associated with the communication format for transmission to the receiving entity.

Alternatively, the data repository 116 can include a set of common templates. The set of common templates can be used for SOA service requests generated by any of the tenants 510A-510C. When a new receiving entity is added to the data repository 116, all tenants 510A-510C of the application server 502 can have access to that receiving entity and send communications to that receiving entity without having to register that receiving entity themselves. In this manner, a tenant 510A-510C can seamlessly send SOA service requests to entities in the data repository 116 and receive responses from those entities.

Figure 6:
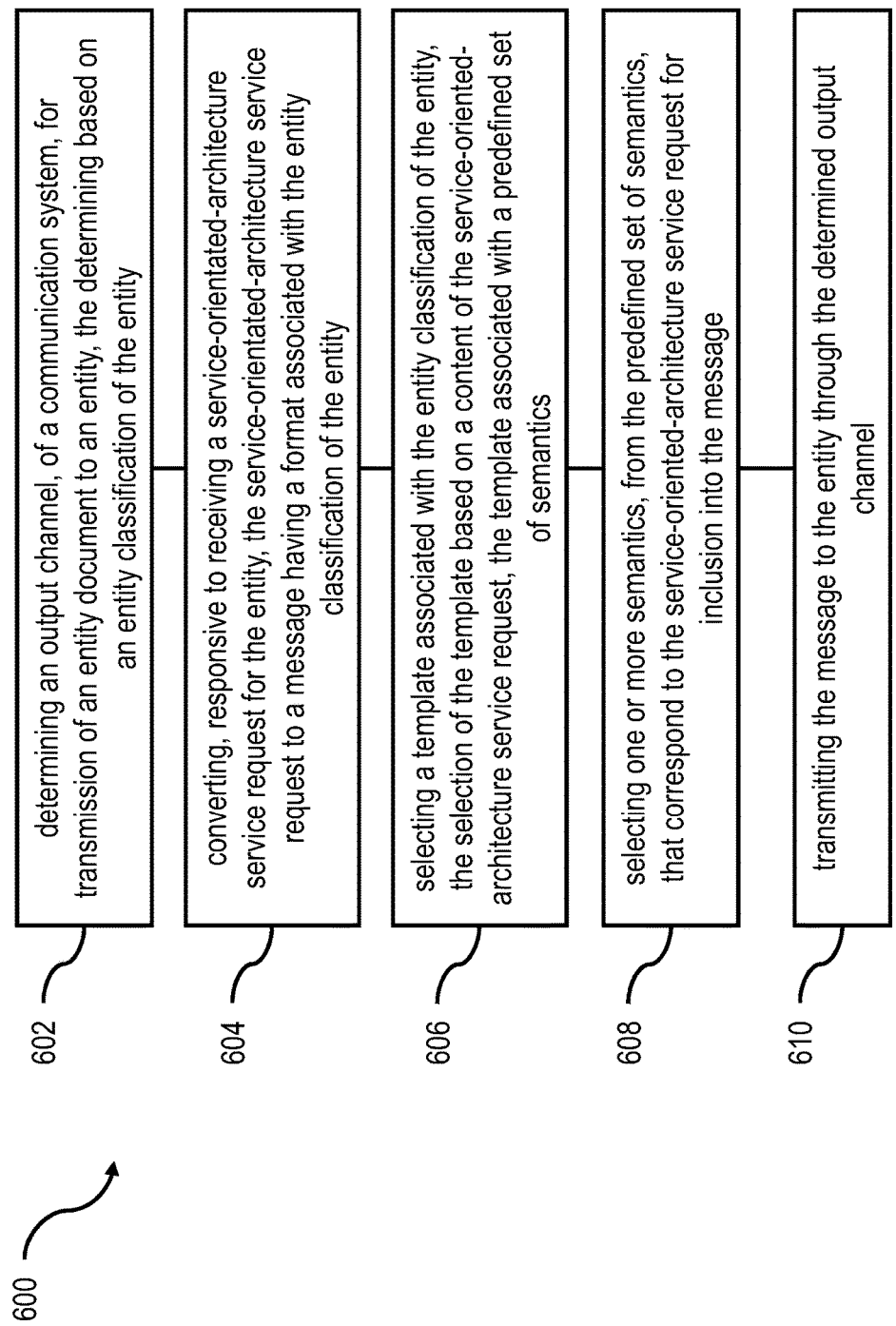
FIG. 6 is a process flow diagram illustrating aspects of a method having one or more features consistent with implementations of the current subject matter; and, FIG. 7 is a process flow diagram illustrating aspects of a method having one or more features consistent with implementations of the current subject matter.
Figure 7:
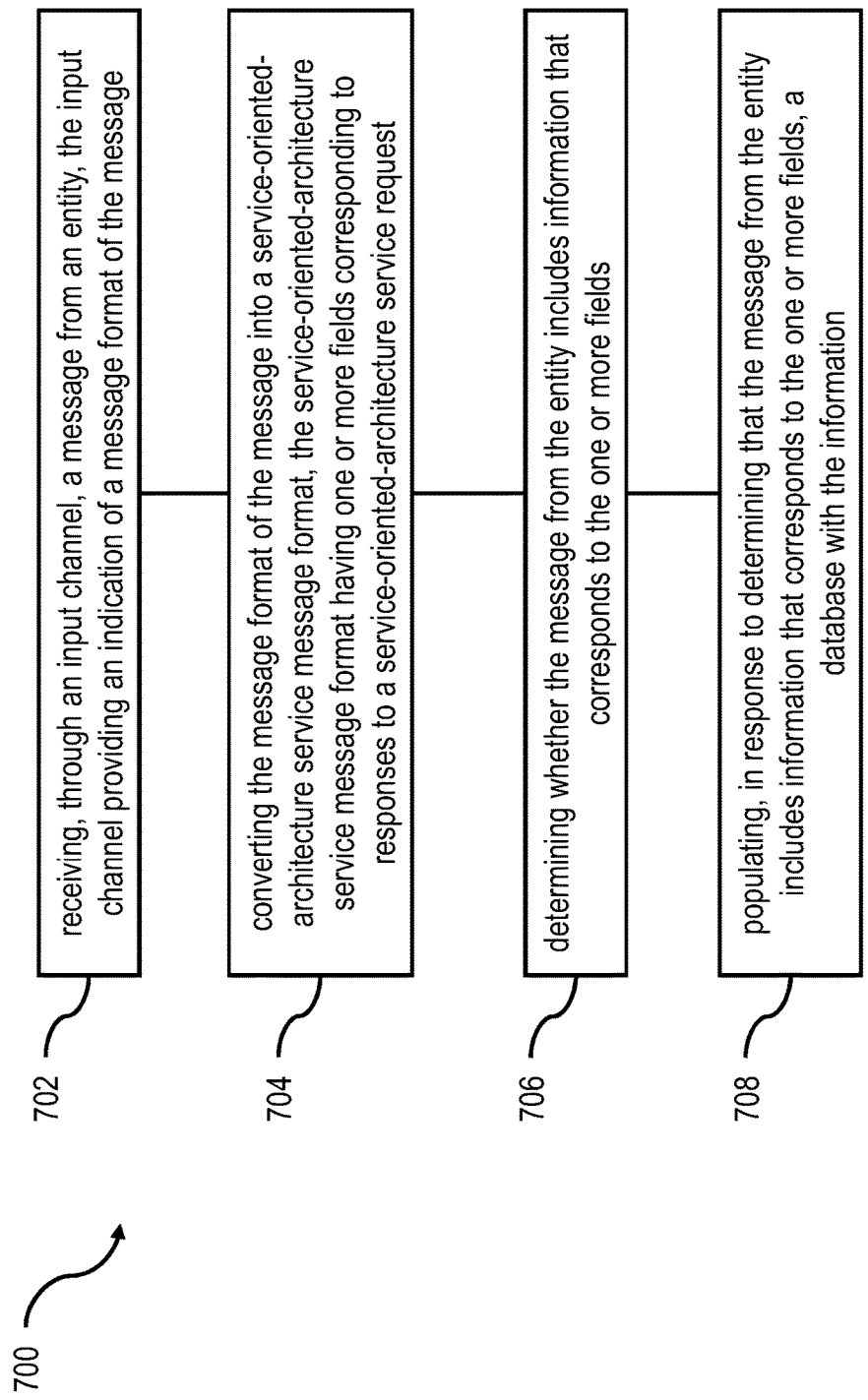

FIGS. 6 and 7 illustrate methods 600 and 700 having one or more features consistent with the current subject matter. The operations of methods 600 and 700 presented below are intended to be illustrative. In some embodiments, methods 600 and 700 may be accomplished with one or more additional operations not described, and/or without one or more of the operations discussed. Additionally, the order in which the operations of methods 600 and 700 are illustrated in FIGS. 6 and 7 and described below is not intended to be limiting.

In some embodiments, methods 600 and 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600 and 700 in response to instructions stored electronically on an electronic storage medium. The one or more processing devices may include one or more devices configured through hardware, firmware, and/or software to be specifically designed for execution of one or more of the operations of methods 600 and 700.

At 602, an output channel can be determined. The output channel can be part of a communication system. The output channel can be used for transmission of an entity document to an entity. The determining can be based on an entity classification of the entity.

At 604, responsive to receiving a service-orientated-architecture service request for the entity, the service-orientated-architecture service request can be converted to a message having a format associated with the entity classification of the entity.

At 606, as part of the converting, selecting a template can be selected. The template can be associated with the entity classification of the entity. The selection of the template can be based on a content of the service-oriented-architecture service request. The template can be associated with a predefined set of semantics.

At 608, as part of the converting, one or more semantics can be selected from the predefined set of semantics. The semantic(s) selected can be those that correspond to the service-oriented-architecture service request. The semantics can be included into the message to the entity.

At 610, the message can be transmitted to the entity through the determined output channel.

At 702, a message can be received from an entity through an input channel. The input channel can provide an indication of a message format of the message by being associated with a particular message format.

At 704, the message can be converted from a format of the message into a service-oriented-architecture service message format. The service-oriented-architecture service message format having one or more fields corresponding to responses to a service-oriented-architecture service request.

At 706, a determination of whether the message from the entity includes information that corresponds to the one or more fields can be made.

At 708, in response to determining that the message from the entity includes information that corresponds to the one or more fields, a database can be populated with the information.

Without in any way limiting the scope, interpretation, or application of the claims appearing herein, a technical effect of one or more of the example embodiments disclosed herein may include facilitating compatibility of inhomogeneous communication infrastructures. The presently described subject matter facilitates the system-wide integration of millions of small business partners into enterprise processes running a sophisticated enterprise infrastructure, such as an ERP system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method to be performed by at least one computer processor forming at least a part of a computing system, the method comprising:
   selecting an output channel, from a plurality of output channels of a communication system, for transmission of an entity document to an entity, the selection based on an entity classification of the entity;
   converting, responsive to receiving a service-orientated-architecture service request for the entity, the service-orientated-architecture service request to a message having a format associated with the entity classification of the entity, the converting comprising:
      selecting a template associated with the entity classification of the entity, the selection of the template based on a content of the service-oriented-architecture service request, the template associated with a predefined set of semantics; and,
      selecting one or more semantics, from the predefined set of semantics, that correspond to the service-oriented-architecture service request for inclusion into the message; and,
   transmitting the message to the entity through the selected output channel.

2. The method of claim 1, wherein the selecting is performed by a database management system.

3. The method of claim 1, wherein the format associated with the entity classification of the entity is a short service message format.

4. The method of claim 3, wherein the template is a short service message format template.

5. The method of claim 1, wherein the format associated with the entity classification of the entity is a multimedia message format.

6. The method of claim 5, wherein the template is a multimedia message format template.

7. The method of claim 1, further comprising:
   receiving, from the entity, a response to the message; and,
   determining, based on the content of the service-oriented-architecture service request and using the predefined set of semantics, a content of the received response.

8. The method of claim 7, further comprising:
   in response to the content of the received response being affirmative, indicating in a database acceptance by the entity of the service-oriented-architecture service request; and,
   in response to the content of the received response being negative, initiating a selection of an alternate entity for transmission of the service-oriented-architecture service request.

9. A method to be performed by at least one computer processor forming at least a part of a computing system, the method comprising:
   receiving, through an input channel, a message from an entity, the input channel providing an indication of a message format of the message;

converting the message format of the message into a service-oriented-architecture service message format, the service-oriented-architecture service message format having one or more fields corresponding to responses to a service-oriented-architecture service request;

determining whether the message from the entity includes information that corresponds to the one or more fields; and, populating, in response to determining that the message from the entity includes information that corresponds to the one or more fields, a database with the information.

10. The method of claim 9, wherein the converting and determining is performed by a database management system.

11. A system comprising:

a processor; and, a memory storing machine-readable instructions, which when executed by the processor, cause the processor to perform one or more operations, the operations comprising:

selecting an output channel, from a plurality of output channels of a communication system, for transmission of an entity document to an entity, the selecting based on an entity classification of the entity;

converting, responsive to receiving a service-orientated-architecture service request for the entity, the service-orientated-architecture service request to a message having a format associated with the entity classification of the entity, the converting comprising:

selecting a template associated with the entity classification of the entity, the selection of the template based on a content of the service-oriented-architecture service request, the template associated with a predefined set of semantics; and, selecting one or more semantics, from the predefined set of semantics, that correspond to the service-oriented-architecture service request for inclusion into the message; and, transmitting the message to the entity through the selected output channel.

12. The system of claim 11, wherein the system comprises a database management system.

13. The system of claim 11, wherein the format associated with the entity classification of the entity is a short service message format.

14. The system of claim 13, wherein the template is a short service message format template.

15. The system of claim 11, wherein the format associated with the entity classification of the entity is a multimedia message format.

16. The system of claim 15, wherein the template is a multimedia message format template.

17. The system of claim 11, wherein the operations further comprise:

receiving, from the entity, a response to the message; and, determining, based on the content of the service-oriented-architecture service request and using the predefined set of semantics, a content of the received response.

18. The system of claim 17, wherein the operations further comprise:

indicating in a database, in response to the content of the received response being affirmative, acceptance by the entity of the service-oriented-architecture service request; and, initiating, in response to the content of the received response being negative, a selection of an alternate entity for transmission of the service-oriented-architecture service request.

19. The system of claim 11, wherein the operations further comprise:

receiving, through an input channel, a message from an entity, the input channel providing an indication of a message format of the message;

converting the message format of the message into a service-oriented-architecture service message format, the service-oriented-architecture service message format having one or more fields corresponding to responses to a service-oriented-architecture service request;

determining whether the message from the entity includes information that corresponds to the one or more fields; and, populating, in response to determining that the message from the entity includes information that corresponds to the one or more fields, a database with the information.

20. The system of claim 19, wherein the system comprises a database management system.

* * * * *